Patented May 20, 1930

1,759,078

UNITED STATES PATENT OFFICE

ALAN DEAN WILKINSON, OF CANANEA, MEXICO, ASSIGNOR TO THE CANANEA CONSOLIDATED COPPER COMPANY, S. A., OF CANANEA, SONORA, MEXICO, A CORPORATION OF MEXICO

METHOD OF SMELTING COPPER

No Drawing. Application filed March 26, 1926. Serial No. 97,766.

This invention relates to improvements in smelting methods and is particularly directed to the smelting of copper in reverberatory furnaces. Heretofore it has been the practice to subject the crushed copper ore to a preliminary roasting or drying before charging the same to the reverberatory furnace. The object of the initial step in the prior practice was to preheat the charge so as to provide increased tonnage with a lower consumption of fuel in the furnace. Another supposed advantage in the prior practice was in the elimination of sulphur from the charge which was utilized to furnish all or part of the fuel for roasting. This has also been thought to control the grade of matte and the iron content of the slag made from the roasted product in the reverberatory furnace.

My improved method is a radical departure from the prior method such as above outlined. Instead of drying, roasting or preheating the charge I feed it directly to the reverberatory furnace in a wet or moist condition. The charge consists of approximately 25% of flotation concentrates, 5 to 9% cold converter chips and 66% to 70% of ore crushed to a size which will pass through a screen of about one-half inch mesh. The charge is bedded to obtain good mixture and is introduced directly to the reverberatory furnace without any preheating or drying. This raw charge contains approximately 9% to 10% of moisture. I have found that there are a number of advantages in feeding the charge in a wet or moist condition.

The presence of moisture in the reverberatory furnace charge facilitates the elimination of sulphur at the high temperature of the smelting zone which in turn controls the disposition of part of the iron content of the charge as between the matte and slag being formed.

While I have referred above to moisture content of a certain percentage it is understood, of course, that the moisture content can be regulated to suit the condition of the charge. In practice, I have determined that a charge from which about one-half of the sulphur would be roasted out by the ordinary method, when charged wet according to my process is smelted very readily and satisfactorily. On the other hand, when the same sort of charge was dried before charging to the reverberatory furnace, this charge did not smelt satisfactorily due to the fact that most of the sulphur melted rapidly with the iron and copper into the matte from the dry charge and thus drew so much of the iron into the matte that the material left was too silicious to fuse readily. A further advantage of introducing a wet charge is that the same has a steeper angle of repose. It will, therefore, stand more nearly vertical and thus not slide down into the channel until smelted. This gives a better exposure to the smelting action by leaving a wider channel through the furnace and making possible a lower cleaner front. This facilitates skimming and results in a slag which is quite free from metal values.

My process also makes for uniformity of operation since it is difficult to maintain a uniform sulphur content in the product from a roaster, and variations of the sulphur content in pre-roasted material results in a variation of the composition in both the slag and the matte produced by the ordinary method.

When preliminary roasting or drying is practiced, there are considerable dust losses from the roaster stack from dust sifting out of the roasting furnaces, flues, etc., and further losses in handling dry or roasted products in a reverberatory furnace. My process entirely eliminates these losses. A further advantage of my process is that the accumulation of dust in the inside of the reverberatory furnace is greatly minimized or practically eliminated because of the moisture content of the charge. This prolongs the life of the silica brick lining of the reverberatory furnace by reducing the fluxing action which takes place in the furnaces operated according to the old methods due to dust coming in contact with the silica brick. My method also greatly reduces the volume of dust carried out with the gases which ordinarily settle out in the flues and waste heat boilers. My process also eliminates the formation of oxides of iron which have a tendency to form ferruginous or magnetic slags of high specific gravity (such as formed in processes which pre-roast the ore) which settle at the bottom of a reverberatory furnace and thus choke the bottom and interfere with the furnace operation.

Smelting the moist or wet charge simplifies the operation since it entirely eliminates the step of roasting and drying which usually precedes the treatment in the reverberatory furnace. The capital investment for plants operated according to my method is much less than plants operating by prior methods. This is because of the elimination of the usual roasting, drying and dust collecting apparatus.

My process results in obtaining the full fuel value from the oxidizable constituents of the charge such as iron and sulphur as they are either oxidized or burned in the reverberatory furnace or go into the matte. The portion of these oxidizable constituents which go into the matte will afterwards be burned in the converters where their oxidization will furnish heat which can be utilized to advantage in smelting additional material. In the usual roasting operation such oxidizable constituents on the other hand are largely burned in the roasting furnace. Thus, much of the heat is lost or dissipated. The dust losses in my process are much less than the losses attendant to the operation of the usual roaster or drying furnace.

Modifications of the specific method described may be made without departing from the invention as defined in the appended claims.

What I claim is:—

1. In the treatment of copper ores, the method which consists in introducing the raw charge to a reverberatory furnace in a moist condition and disposing it at an abnormally steep angle so as to maintain a molten bath of abnormal width in the furnace.

2. The method which consists in introducing to a reverberatory furnace a raw charge comprising crushed copper ore, cold converter chips and flotation concentrates in a wet or moist condition and subjecting the charge to a smelting temperature.

3. The method which consists in introducing to a reverberatory furnace a raw unroasted moist charge and banking the same in the furnace so that its exposed surface lies at a steeper angle of repose than that which such material would lie in if dry.

4. The method which comprises placing an unroasted raw charge of copper ore in piles to form a channel in a reverberatory furnace in a wet or moist condition so that it will not slide down into the channel in the furnace until smelted.

5. The method of smelting which consists in disposing in a reverberatory furnace an unroasted mass of moist raw copper ore whose exposed face lies at an angle steeper than that obtainable with dry ore so as to leave a wider channel through the furnace.

6. In the smelting of copper, the method which consists in introducing into a reverberatory furnace a raw charge of crushed ore having a moisture content of substantially or approximately 9%.

7. The method of treating copper which consists in introducing into a reverberatory furnace a moist charge consisting of approximately 66% crushed copper ore, 5% to 9% cold converter chips, 29% of flotation concentrates and banking the same in the furnace at an abnormally steep angle so as to maintain an abnormally wide channel through the furnace.

8. The process of smelting sulphide ores in a reverberatory smelting furnace, which includes subjecting the ores to a smelting heat while said ores are mixed with approximately ten percent by weight of water.

In witness whereof, I have hereunto signed my name.

ALAN DEAN WILKINSON.